H. VON SCHÜTZ.
DRYING APPARATUS FOR AGRICULTURAL PRODUCTS AND THE LIKE.
APPLICATION FILED JAN. 17, 1907.

Patented Nov. 17, 1908.

WITNESSES:

INVENTOR
Hubert von Schütz
BY
his ATTORNEY.

H. VON SCHÜTZ.
DRYING APPARATUS FOR AGRICULTURAL PRODUCTS AND THE LIKE.
APPLICATION FILED JAN. 17, 1907.

904,020.

Patented Nov. 17, 1908.

2 SHEETS—SHEET 2.

WITNESSES:

INVENTOR
Hubert von Schütz
BY
his ATTORNEY

UNITED STATES PATENT OFFICE.

HUBERT VON SCHÜTZ, OF ZOPPAT, NEAR DANZIG, GERMANY, ASSIGNOR OF ONE-HALF TO LUCIAN GOTTSCHO, OF BERLIN, GERMANY.

DRYING APPARATUS FOR AGRICULTURAL PRODUCTS AND THE LIKE.

No. 904,020.  Specification of Letters Patent.  Patented Nov. 17, 1908.

Application filed January 17, 1907. Serial No. 352,706.

*To all whom it may concern:*

Be it known that I, HUBERT VON SCHÜTZ, a citizen of the German Empire, and a resident of Zoppat, near Danzig, Germany, have invented certain new and useful Improvements in Drying Apparatus for Agricultural Products and the Like, of which the following is a specification.

This invention has reference to an apparatus for drying agricultural products, such as potato chips, edible leaves, grains and the like.

Heretofore drying apparatus for agricultural products were constructed in which the oven, heating chamber, cylinders and exhausters were arranged successively one behind the other.

The present invention has for its purpose to produce a drying apparatus in which the heating chamber is of special construction and serves as a heat reservoir which is in connection with an exhauster.

The heating chamber forms part of the heating conduit or duct and is provided with regulating devices for the admission of air. Accordingly the hot gases of the oven may be mixed in the heating chamber with fresh air whereby the desired temperature may be uniformly maintained. The sums of the cross sections of openings leading from the heating chamber to the drying cylinders are not large enough to permit of conducting away all the hot gases from the heating chamber, so that there remains always a certain quantity of hot gases in the heating chamber which thus constitute not solely part of the heat conduit or duct but also a heat reservoir. The exhauster arranged in the rear of the cylinders produces in the heat conduit continuously a certain rarefication, therefore the heat conduit forms a heat reservoir which is in connection with the exhauster which is one of the novel features of this invention. The cylinders are arranged on both sides of the heating chamber and are in connection with same by means of openings located at various heights. Hereby I attain that the drying apparatus permits of a very economic and uniform combustion of the fuel and the tempered heat gases are uniformly introduced into the drying cylinders.

Figure 1:
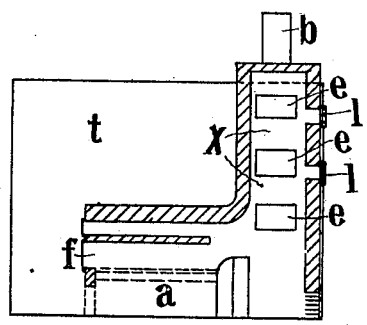
Figure 2:
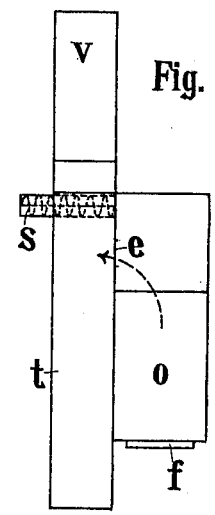
Figure 3:
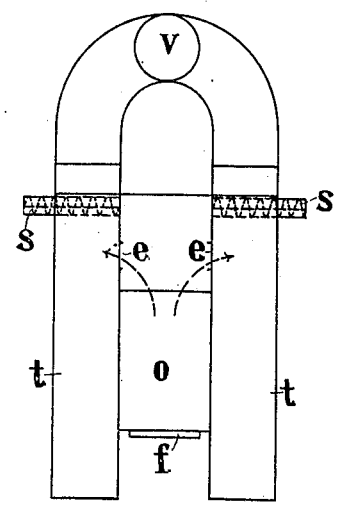
Figure 4:
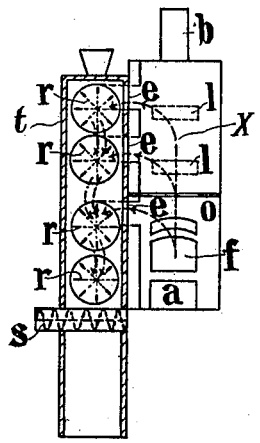
Figure 5:
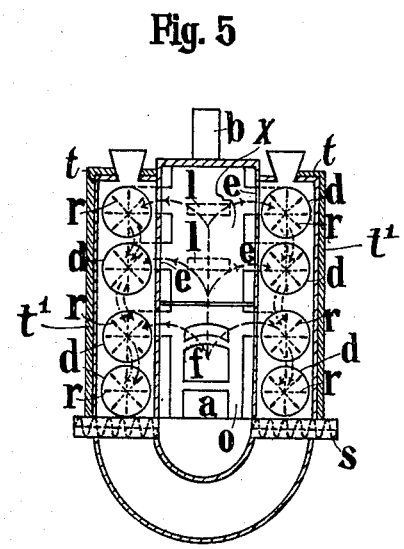
Figure 6:
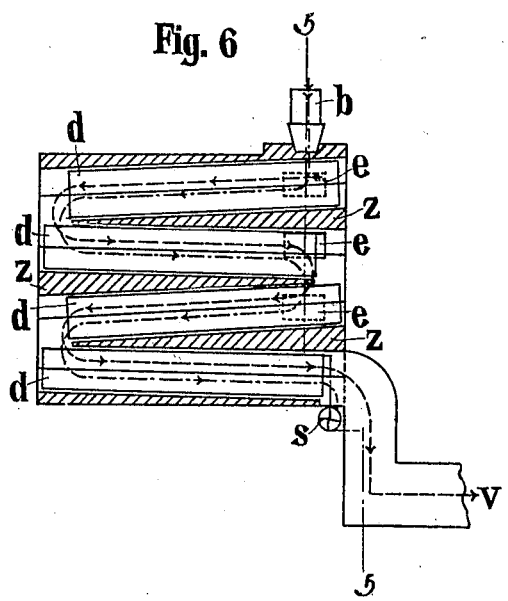

The invention is illustrated in the accompanying drawings in which:

Figure 1 represents in sectional side view an oven of a drying apparatus which embodies in desirable form the present improvements. Fig. 2 shows in bottom plan view a small apparatus. Fig. 3 is a like view of a large apparatus. Fig. 4 is a front elevation of the small apparatus shown on Fig. 2. Fig. 5 is an irregular vertical section on the plane of line 5, 5 of Fig. 6. Fig. 6 is a vertical section through one of the oven chambers.

Similar letters of reference denote like parts in all the figures.

In the drawings *a* is the furnace, *f* the fire-place, *o* the space above the fire-place from whence the hot gases pass through the inlets *e* into the drying apparatus *t* and *b* is the chimney or funnel. To regulate the heat in the drying apparatus the dampers *l* are provided. Within the drying oven *t* there are mounted a multiple of cylinders *d*, eight are shown on the drawings. The cylinders *d* are arranged in alternately slanting positions so that the goods to be dried can pass from the upper cylinder into the next one etc. Within each cylinder there is a stirring mechanism *r* of any approved construction to agitate or move constantly the goods to be dried. Spirals *s* remove the dried goods from the apparatus. The tube *v* connects with an exhauster to remove the air which is saturated with moisture, *x* represents the flue and *z* is a free space between the cylinders and the wall of the drier.

A more detailed description of the particularly advantageous forms as shown in Figs. 3, 5, and 6 will make clear the construction and operation of the apparatus.

To start the fire the flue *x* and chimney *b* are provided. Various regulating dampers *l* serve to regulate the entrance of air into the oven and the hot air which comes from the flue *x* and enters the drying apparatus *t*.

The drying apparatus *t* consists of two compartments which are located one to the right and one to the left of the furnace. The two compartments being of same construction may both be used for drying goods independently, however, one compartment may serve as the auxiliary drier while the other may constitute the finishing drier. The partially dried goods are simply removed from the auxiliary drier and run through the finishing drier. The goods having lost most of their water in the auxiliary drier, are thoroughly dried in the second compartment by fresh hot gases which are devoid of any water vapors. The drying apparatus is further so constructed that the space o for the hot gases is located between the two compartments of the drier. This arrangement presents a great advantage, both driers receiving hot air from one space and from one fire. The construction is such that both compartments receive fresh hot air during the various stages of the process of drying and at various intervals. In accordance with this the auxiliary and finishing drying may take place in either compartment, both receiving hot air from one furnace which enters repeatedly at different periods of time; in this way the temperature may be raised up to 800 degrees C. By virtue of this arrangement is attained that the temperature in the drier is constantly increased although the evaporation of the water contained in the goods constantly tends to reduce same. Hereby the effect in the drying is considerably augmented and the settling of condensing moisture on the dried material is prevented in the lower regions of the apparatus. After the renewed hot air is loaded with water vapors, it is exhausted from the apparatus through the channel v.

The advantage of the present system and apparatus consists primarily in rendering it possible to dry to any desired degree substances which, so far, could not be economically dried on account of their high percentage of starch and secondly in the fact that at relatively low consumption of coal great quantities of material can be dried. Accordingly the cost of drying by hundred weight of material is very low.

Each compartment of the drier has four alternately inclined cylinders or drums d arranged one above the other and contained in the drier t which is insulated in the usual maner to prevent radiation of heat as shown in Fig. 5 as at t'. The drums or cylinders are made of strong iron sheeting and connected in such manner that both the material to be dried and the hot air pass from one drum to the other.

During the process of drying such as potato chips, grains, edible leaves, etc. are constantly agitated by the stirring device located therein whereby the material comes continuously in good contact with the hot air. The motion of the material is effected by the stirring device, the hot air which moves in the same direction and by reason of the inclination at which the cylinders are arranged. The speed of the material as well as the heat in the drier may be regulated separately in each compartment in a very exact manner. The temperature in the drying apparatus is determined at various places by means of pyrometers which are not shown on the drawings. In accordance with the registration of those pyrometers the entrance of the hot gases through the inlets e is regulated and if necessary cold air may be admitted through the dampers l.

The drying apparatus is operated in a very simple manner: After potatoes, for instance, have been washed and cleaned they are transported into the chipping machine which is mounted above the drying apparatus. The potato chips fall directly into the drying apparatus and pass through same in the described manner through the drums or cylinders in the direction indicated in Fig. 6 by the dash and dot line. The dried but still hot material is removed from the apparatus by means of the spirals s. The hot gases pass through the apparatus in the same direction as indicated by the dash line in Fig. 6 and pass into the tube v which connects with the exhauster.

Having thus described my invention I claim as new and desire to obtain by Letters Patent,

1. An apparatus for drying agricultural products comprising essentially a furnace, a heating chamber behind same, a drying apparatus and an exhauster, a number of alternately inclined cylinders within the drier connecting with each other having openings, and stirring mechanisms one in each cylinder, means for introducing and regulating the flow of the hot gases into the drying apparatus, and means for mixing fresh air with the hot gases in the heating chamber, so arranged that said heating chamber serves as a partially rarefied heat reservoir.

2. An apparatus for drying agricultural products by direct heating gases comprising a furnace, a heating chamber behind same having openings arranged one above the other for the passage of the hot gases, a drying apparatus, a number of alternately inclined cylinders within said drier connecting with each other, and having openings, stirring mechanisms, one in each cylinder, means for mixing fresh air with the hot gases in the heating chamber to maintain the desired temperature, means for removing the dried products, and an exhauster for withdrawing the hot gases which are saturated with water vapor and rarefying the interior space so that the heating chamber acts as a conduit for the hot gases and also as a partially rarefied heat reservoir.

3. An apparatus for drying agricultural products by direct heating gases comprising a furnace, a heating chamber behind same having openings arranged above each other, a drying apparatus proper composed of two compartments one arranged closely at each side of said heating chamber, a number of alternately inclined cylinders within each compartment connecting with each other and having openings, stirring mechanisms one in each cylinder, means for mixing fresh air with the hot gases in the heating chamber, means for removing the dry products, and an exhauster for withdrawing the hot gases which are saturated with water vapor and rarefying the interior space so that the heating chamber acts as a conduit for the hot gases and also as a partially rarefied heat reservoir.

4. An apparatus for drying agricultural products by direct heating gases comprising a furnace, a chamber behind the furnace having openings arranged above each other for the passage of the hot gases, dampers on said openings, a drying apparatus proper composed of two compartments one arranged closely at each side of said heating chamber, a number of alternately inclined cylinders within each compartment connecting with each other and having openings, stirring mechanisms one in each cylinder, dampers for admitting fresh air into the heating chamber to maintain the desired temperature, means for removing the dry products, and an exhauster for withdrawing the hot gases which are saturated with water vapor and rarefying the interior space so that the heating chamber acts as part of the heat duct and also as a partially rarefied heat reservoir.

Signed at Danzig this 5th day of January 1907.

HUBERT VON SCHÜTZ.

Witnesses:
 ERNST SHMUSKI,
 WILLY REITMEYER.